United States Patent [19]

Nagataki et al.

[11] Patent Number: 5,527,479
[45] Date of Patent: Jun. 18, 1996

[54] LUBRICATING COMPOSITION AND RECORDING MEDIUM USING THE SAME

[75] Inventors: Yoshiyuki Nagataki, Toride; Hideki Nagano, Ibaraki-ken, both of Japan

[73] Assignee: Hitachi Maxell, Ltd., Osaka, Japan

[21] Appl. No.: 304,558

[22] Filed: Sep. 12, 1994

[30] Foreign Application Priority Data

Sep. 20, 1993 [JP] Japan .................... 5-233189

[51] Int. Cl.[6] .................... C10M 155/02; C10M 105/76; C10M 107/50
[52] U.S. Cl. ....................... 252/49.6; 252/56 R
[58] Field of Search .............................. 252/49.6

[56] References Cited

U.S. PATENT DOCUMENTS

| | | | |
|---|---|---|---|
| 3,290,248 | 12/1966 | Blanchard | 252/49.6 |
| 3,664,957 | 5/1972 | McCabe | 252/49.6 |
| 4,007,314 | 2/1977 | Higuchi et al. | 252/49.6 |
| 4,088,591 | 5/1978 | Brown, Jr. et al. | 252/49.6 |
| 4,356,098 | 10/1982 | Chagnon | 252/49.6 |
| 4,707,280 | 11/1987 | Kaimai et al. | 252/49.6 |
| 5,051,318 | 9/1991 | Nishikawa et al. | 252/49.6 |

FOREIGN PATENT DOCUMENTS 63-289098 11/1988 Japan.
2-140297 5/1990 Japan.

*Primary Examiner*—Ellen M. McAvoy
*Attorney, Agent, or Firm*—Birch, Stewart, Kolasch & Birch

[57] ABSTRACT

A lubricating composition having an affinity for synthetic resins comprising a silicone oil and a fatty acid-modified silicone and a fatty acid ester. The lubricating coating composition is utilized in the preparation of a magnetic recording medium.

10 Claims, 1 Drawing Sheet

LUBRICATING COMPOSITION AND RECORDING MEDIUM USING THE SAME

BACKGROUND OF THE INVENTION

Field of the Invention

The present invention relates to a general purpose lubricating composition. In particular, the invention provides a useful lubricating composition which is particularly excellent in resistance to sliding and is suited for use in magnetic recording, optical recording, magneto-optical recording and like recording media in the form of disk, tape, etc. As described below, the invention particularly exhibits its usefulness when applied to magneto-optical recording media, in which recording is performed with a sliding magnetic head at a low speed rotation.

Discussion of Related Art

Lubricants which are already include fatty acid-modified silicones, fatty acid esters, silicone oils and fluorinated oils. In fact, these lubricants have been widely used in the friction mechanism of various machines to decrease the sliding resistance. In many cases, however, the parts of the machines are made of strong metals, and minute scars on the surface of the parts which might be caused by sliding have not been regarded as a serious problem. Consequently, serious investigations regarding the combined use of different kinds of lubricants, in other words lubricating compositions, have hitherto been made only in rare cases.

With the development of the precision machinery industry, however, machines have come to be designed for use under such severe lubricating conditions that minute machine parts made of synthetic resins, for which a high strength can not be expected, are subjected to severe sliding contact and the resultant resistance to friction has come to be strictly evaluated. Under such situations, the role of lubricants of complementing the performance of the machine parts has come to be highlighted and, in company therewith, increasingly stricter requirements have come to be asked for lubrication, including the decrease of friction at the mechanical parts of electronic instruments.

As one such example in which lubrication is strictly required, there can be referred to so-called recording media. Among them, the magneto-optical recording medium, the basic principle of which lies in locally raising the temperature of magnetic thin film over the Curie point or the temperature compensation point to make the coercivity of the local parts disappear and inverse the direction of magnetization to the direction of recording magnetic field applied from outside, has been put to practical use in external memories of optical filing systems and computers, and recording devices for acoustic or image information. It generally comprises a recording part formed by laminating on one side of a transparent substrate made of polycarbonate or the like a recording magnetic layer which has the axis of easy magnetization in an direction perpendicular to the film plane and exhibits a large magneto-optical effect, a reflective layer and a dielectric layer, and further a covering layer formed for playing a role of protecting the recording layer from corrosion. The material of the covering layer, i.e., protective layer, now in use is not a metal but a soft ultraviolet curing resin (UV resin), silicone resin, or the like. Reading of signals is performed by irradiating laser light from the transparent substrate side. Among magneto-optical recording systems, in the magnetic field modulation system, which is capable of overwriting, information signals are written into the magnetic thin film by inverting the applied magnetic field at a high speed, and the application of the magnetic field is usually conducted with a magnetic head having a magnetic field generating means.

In this case, a magnetic head which applies a high speed inverting magnetic field can generate only a very weak magnetic field owing to various restrictions, so that the magnetic head must be brought as close to the recording magnetic layer as possible. However, in systems of a low speed of rotation of 1000 rpm or less, particularly a rotation of about 300–800 rpm, a non-contact, so-called flying head as used for hard disks cannot be employed and hence a magneto-optical recording system in which recording is conducted with a magnetic head sliding along a magneto-optical recording medium is to be considered. In this case, sliding between the magnetic head and the covering layer becomes a problem.

When the friction between the magnetic head and the covering layer is high, the magnetic head will vibrate while travelling, causing trouble in recording and, when the friction is particularly high, making the travelling of the magnetic head itself impossible. Further, scars and abrasion of the covering layer caused by sliding become a problem. To solve these problems, friction between the head and the covering layer must be decreased.

To decrease friction between a recording medium and a magnetic head, it has already been practiced to coat a lubricant, as in magnetic disks, or to add a lubricant to the magnetic layer, as in floppy disks (FD). Lubricants known to be used in these cases include fatty acid-modified silicones, fatty acid esters, silicone oils and fluorinated oils.

However, the recording material of a magneto-optical recording medium, particularly magneto-optical disk, is made of a magnetic substance, is itself soft and readily scarred, and is covered with a covering layer of synthetic resin, such as UV resin. When a prior lubricant is merely coated thereon, the sliding property is deteriorated because of the presence of a peculiar phenomenon of lubricant starvation at the time of sliding. It is sure that these lubricants have been regarded useful in decreasing friction between metals and/or metal oxides, but they cannot be said to have been satisfactory in decreasing friction between polymers, such as UV resins, decreasing abrasion of polymers and decreasing friction at high speed sliding.

This signifies that the lubricating means used for FDs or hard disks cannot be applied as it is to the magneto-optical recording medium. The reason for this can be considered as follows. In contrast with a magnetic disk along which a flying head slides only at the times of starting and stopping, there is a phenomenon peculiar to a magneto-optical recording disk, in which the magnetic head or its carrier always slides along the covering layer during recording. Therefore, it is impossible to prevent lubricant starvation by filling a lubricant in the voids of the magnetic layer as can be done in a floppy disk. That is, since the interaction between an ultraviolet curing resin and a prior art lubricant is small, the lubricant cannot be held strongly by the medium, unlike in the case of a metal thin film medium and a lubricant having a polar group. To solve this problem, the present invention has been derived.

SUMMARY OF THE INVENTION

When a lubricating composition is made to comprise at least (a) a silicone oil and (b) a fatty acid-modified silicone, the resulting composition exhibits a high lubricating effect and moreover is free from the phenomenon of lubricant starvation. This is because a silicone oil (a), which has a strong interaction with a covering layer due to Van der Waals forces, and a fatty acid-modified silicone (b), which has itself a high oil film strength, are readily compatible with each other. A silicone oil (a) by itself has a small lubricating effect, and a fatty acid-modified silicone (b) by itself has a small interaction with a protective layer of ultra violet curing resin, which results in the phenomenon of lubricant starvation. However, when the two are used in combination, such a phenomenon is avoided and resultantly even when a magnetic head or a magnetic head carrier and a recording medium are made to slide along each other, a satisfactory sliding resistance characteristic can be realized. When a fatty acid ester (c) is further added to the composition, since the compatibility between the fatty acid-modified silicone (b) and the fatty acid ester (c) is also good, the lubricating composition is strongly held by the protective layer, as in the case described above. Further, since a fatty acid ester has an excellent lubricating property, the lubricating composition (a+b+c) containing the same has an excellent sliding characteristic and can secure stable travelling of a magnetic head with low friction and a sufficient durability to abrasion and damages.

Since the roles of silicone oil (a), fatty acid-modified silicone (b) and fatty acid ester (c) differ delicately from one another as described above, the proportion of the respective components in the composition is desirably regulated, as specified by the following equations, to obtain a lubricating composition particularly suited for use in recording media, such as magnetic recording, optical recording and magneto-optical recording media: regarding the weight ratio of a to b, $0.1 \leq a/(a+b) \leq 0.98$; regarding the weight ratio of b to c, $0.5 \leq b/(b+c) \leq 0.99$; and regarding the weight ratio of c to a, $0.001 \leq c/(c+a) \leq 0.1$. Further, the ratios of the number average molecular weights of the respective components are desirably regulated as specified by the following equations: regarding the number average molecular weight of a, Ma, and the number average molecular weight of b, Mb, $1 \leq Ma/Mb \leq 100$; regarding the number average molecular weight of b, Mb, and the number average molecular weight of c, Mc, $2 \leq Mb/Mc \leq 50$; and regarding the number average molecular weight of c, Mc, and the number average molecular weight of a, Ma, $0.002 \leq Mc/Ma \leq 0.2$.

Such a lubricating composition particularly exhibits a marked effect for a magneto-optical recording medium which records signals by making sliding contact with a magnetic head. Magneto-optical recording media of this kind have a recording magnetic layer on a disk-shaped transparent substrate and have a covering layer containing synthetic resin formed on the magnetic layer. The lubricating composition is suitably applied by such means as coating it on the surface of the covering layer.

The present invention is described in detail below with reference to the attached drawing wherein:

DETAILED DESCRIPTION OF THE INVENTION

Figure 1:
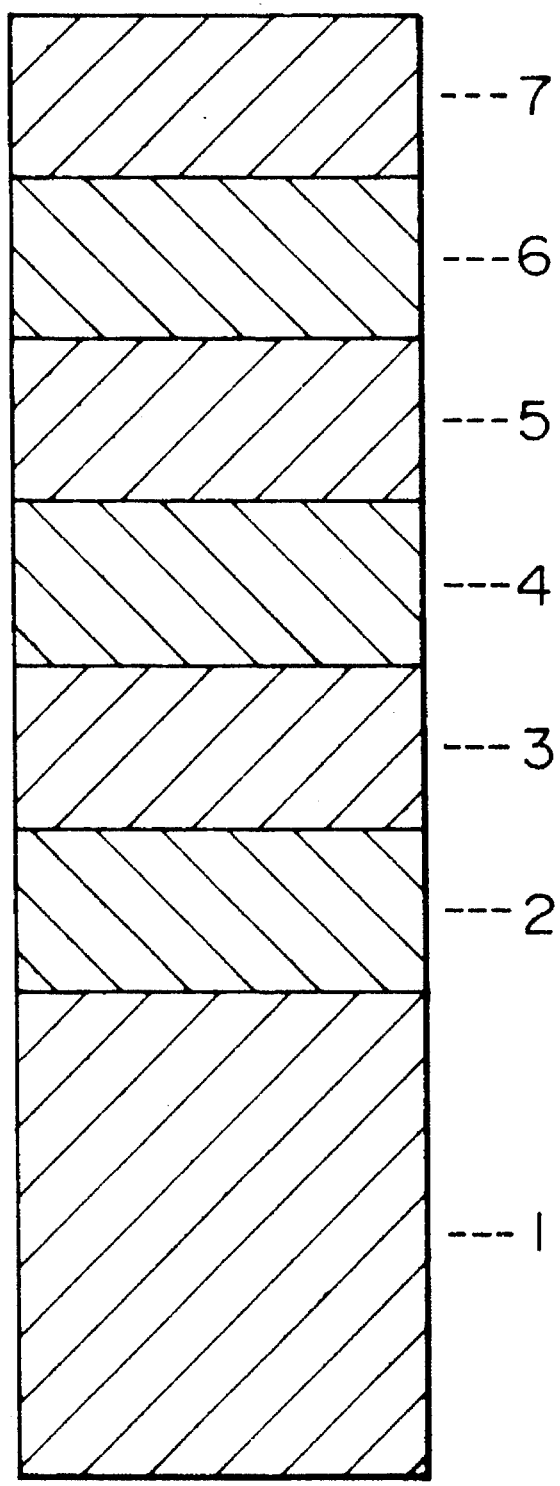
FIG. 1 is a sectional view of a magneto-optical disk according to the present invention.

FIG. 1 is a sectional view showing the construction of one example of the magneto-optical recording media according to the present invention. As is apparent from the Figure, one example of the magneto-optical recording media according to the present invention is formed by successively laminating on the surface of a transparent substrate 1, a first dielectric layer 2, a first magnetic layer 3, a second magnetic layer 4 and a reflective layer 5, the surface of the reflective layer 5 being covered by a covering layer 6, and further forming a lubricating layer 7 on the surface of the covering layer 6.

The transparent substrate 1 is formed into a desired shape and dimension with a transparent ceramic material, such as glass, a transparent resinous material, such as polycarbonate resin, poly(methyl methacrylate) resin, polyolefin resin and epoxy resin, and the like. On one side of the transparent substrate 1, preformat patterns, for example, guide grooves for writing/reading a laser beam and prebit strings, are formed in the form of minute surface unevenness, to form a signal plane. The method of forming the preformatted patterns and the arrangement thereof are not described here since they are already known to the art and do not relate to the essence of the present invention. With respect of these, appropriate techniques known to the art can be used in accordance with the kind of magneto-optical recording medium.

The first dielectric layer 2 is provided for causing multiple interference of laser beam reading to take place between the transparent substrate 1 and the magnetic layer 3 thereby enhancing the apparent magneto-optical effect, and is formed with an inorganic dielectric having a larger refractive index than the transparent substrate 1. The magnetic layer 3 may be formed with any known and suitable materials which exhibit a magneto-optical effect, but is particularly suitably an amorphous vertically magnetized film based on rare earth-transition metals because it provides large magneto-optical effects, such as Kerr rotation angle and Faraday rotation angle. The second dielectric layer 4 is provided for causing multiple interference of the reading laser beam to take place between the magnetic layer 3 and the reflective layer 5 thereby to increase the apparent magneto-optical effect, and is formed with an inorganic dielectric similar to that used for the first dielectric layer 2. The reflective layer 5 is provided to increase the reflectance of the medium and increase the read back signal output from the magneto-optical recording medium, and is formed, for example, with aluminum, gold, or alloys comprising one of these metals as the main component. The respective layers 2 to 5 may be formed continuously by vacuum film forming methods, such as sputtering and vacuum vapor deposition.

The covering layer 6 is provided to prevent the corrosion of the magnetic layer 3 which might be caused by the environment during storage and is desirably formed with an ultraviolet curing resin. The ultraviolet curing resin used may be any one known to the art. The thickness of the covering layer 6 is preferably about 0.1 μm–50 μm. When the thickness of the covering layer 6 exceeds 50 μm, the strength of the magnetic field which reaches the magnetic layer 3 becomes small, which necessitates a large recording electric current at the time of recording or erasing. On the other hand, when the thickness of the covering layer 6 is less than 0.01 μm, a sufficient impact strength cannot be exhibited. The covering layer 6 can be formed by spray coating, spin coating, or the like. The lubricating layer 7 is provided to decrease the frictional force between the covering layer and the magnetic head during magneto-optical recording, thereby to secure a stable travelling of the magnetic head and prevent abrasion and damage of the respective layers of the disk, including the covering layer and the magnetic layer, caused by sliding of the magnetic head. The selection of the materials from which the lubricating layer is formed constitutes an important point of the present invention. It is essential to use, as the lubricant, a lubricating composition which comprises at least a silicone oil and a fatty acid-modified silicone and which further can contain a fatty acid ester.

Examples of silicone oils which may be used include dimethylsilicone oil, methylphenylsilicone oil obtained by substituting a part of the methyl groups of dimethylsilicone oil, and alkyl-modified silicone oil obtained by substituting a part of the methyl groups of dimethylsilicone oil with an alkyl group. The silicone oil has a viscosity of preferably not less than 10 cSt, more preferably not less than 1000 cSt.

The fatty acid-modified silicone may be any one which is obtained by modifying the terminal or side chain of the silicone oil with a fatty acid, but is preferably one represented by the formula

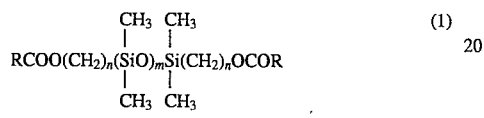

wherein R is an aliphatic hydrocarbon group, m is preferably an integer specified by $5 \leq m \leq 500$, and n is preferably an integer of 1 or more. The aliphatic hydrocarbon group R in the formula (1) may be either linear or branched and may contain one or more double bonds.

The fatty acid ester may be any one obtainable by esterifying a fatty acid, such as lauric acid, myristic acid, palmitic acid, stearic acid and oleic acid, with an alcohol, such as methyl alcohol, ethyl alcohol, butyl alcohol, octyl alcohol and oleyl alcohol. The ester may contain one or more double bonds or branchings in the molecule.

The thickness of the lubricating layer is preferably 1 nm–1 μm. When the thickness exceeds 1 μm, problems in travelling of the magnetic head, e.g., sticking of the head to the disk, are apt to occur. When the thickness is less than 1 nm, on the other hand, sufficient durability may be difficult to obtain.

The lubricating layer may be formed by optional methods in the present invention. For example, the layer can be formed by coating a solution of the above-mentioned lubricant in a solvent on the covering layer by means of a spin coater, roll coater or bar coater.

By providing the lubricating layer as described above, a peculiar effect of maintaining a good sliding characteristic without running short of lubricant even during sliding can be exhibited, which effect has not been attainable by merely coating a silicone oil, fluorinated oil or fatty acid ester of the prior art on the covering layer, and a satisfactory sliding resistance characteristic can be secured even when the magnetic head or the magnetic head carrier and the recording medium are made to slide along each other.

REFERRED EMBODIMENT

The present invention is described in detail below with reference to the Examples, which however are merely for the sake of illustration and in no way limit the present invention.

Example 1—Experiment with poly(methyl methacrylate) disk

On a poly(methyl methacrylate) disk 2 mm in thickness and 70 mm in diameter was coated a lubricating composition comprising 50 parts by weight of dimethylsilicone oil (average molecular weight: about 38,000, viscosity: about 10,000 cSt), 8 parts by weight of a fatty acid-modified silicone (i) having an average molecular weight of about 3,300 and the structure of the following formula (i), 9 parts by weight of a fatty acid-modified silicone (ii) having an average molecular weight of about 3,300 and the structure of the following formula (ii), 1 part by weight of methyl stearate (molecular weight: 298), 2 parts by weight of oleyl oleate (molecular weight: 532) and 25,000 parts by weight of hexane. The structures of the fatty acid-modified silicones (i) and (ii) are as follows.

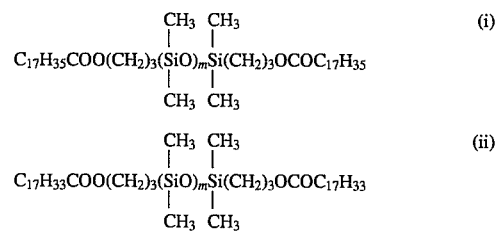

By using a friction tester provided with a plastic-made slider having a radius of curvature of 5 mm, the slider was contacted with the poly(methyl methacrylate) disk prepared above at a position of a radius of 25 mm, a load of 7 g was applied to the slider, then the disk was rotated at 500 rpm, and the degree of scarring of the surface was examined. The degree of scarring was evaluated in the same manner as that used for judging the sliding scar of a magneto-optical disk described later. Resultantly, no scar was observed and the result of evaluation was rated as ⊚.

Examples 2 to 4

The same procedures as in Example 1 were repeated except that the fatty acid-modified silicone (ii) and oleyl oleate were not used and the amount (A) of dimethylsilicone oil, the amount (B) of fatty acid-modified silicone (i) and the amount (C) of methyl stearate were changed respectively as shown in Table 1, to prepare lubricating compositions. The molecular weights of the dimethylsilicone oil, fatty acid-modified silicone and methyl stearate were respectively the same as those used in Example 1. Each of the lubricating compositions thus obtained was coated on the same poly(methyl methacrylate) disk as used in Example 1 and the resulting disk was evaluated in the same manner as in Example 1. The results obtained are shown in Table 1.

TABLE 1

| Example | Amount of dimethyl-silicone oil A (part by wt) | Amount of fatty acid-modified silicone (i) B (part by wt) | Amount of methyl stearate C (part by wt) | Degree of Scarring |
|---|---|---|---|---|
| 2 | 50 | 17 | 3 | ⊚ |
| 3 | 5 | 55 | 10 | ○ |
| 4 | 66 | 3 | 1 | ○ |

Examples 5 to 11

In the same manner as in Example 2 except that the molecular weight of dimethylsilicone oil, Ma, the molecular weight of fatty acid-modified silicone (i), Mb, and the molecular weight of fatty acid ester, Mc, were varied as shown in Table 2 while the amounts of the respective components were kept unchanged, lubricating compositions were prepared, coated on poly(methyl methacrylate) disks, and the resulting disks were examined for their degree of surface scarring. The results are shown in Table 2.

TABLE 2

| Example | Molecular weight of dimethyl-silicone oil | Molecular weight of fatty acid-modified silicone (i) | Molecular weight and kind of fatty acid ester | Degree of scarring |
|---|---|---|---|---|
| 2 | 38000 | 3300 | 298 Methyl stearate | ⊙ |
| 5 | 50000 | 3300 | 340 Butyl stearate | ⊙ |
| 6 | 4000 | 5000 | 298 Methyl stearate | ○ |
| 7 | 160000 | 1400 | 298 Methyl stearate | ○ |
| 8 | 50000 | 1000 | 532 Oleyl oleate | ○ |
| 9 | 50000 | 14000 | 214 Methyl laurate | ○ |
| 10 | 160000 | 3300 | 214 Methyl laurate | ○ |
| 11 | 2000 | 3300 | 532 Oleyl oleate | ○ |

In the Examples, the degree of scarring of the poly(methyl methacrylate) disk was evaluated in the following manner with the intention of obtaining as objective evaluation as possible. The sliding marks after 20 passes were photographed by using a photomicrographic apparatus (mfd. by Olympus Optical Co. Ltd.) at magnifications, and the photograph was visually observed by 100 observers. The results were then averaged to calculate a synthetic evaluation result. When 90 or more observers judged that utterly no sliding scar was present the result was expressed as ⊙, and when 60 or more observers judged that utterly no sliding scar was present the result was expressed as o.

Preparation of magneto-optical disk

On a disk-shaped transparent substrate made of polycarbonate (refractive index: 1.58) 1.2 mm in thickness and 64 mm in diameter, were successively formed the following 4 layers to obtain a magneto-optical disk. The thickness of each layer is as follows.

| First dielectric layer | $Si_3N_4$ | 1,000 Å |
| Recording magnetic layer | Te-Fe-Co-Cr | 230 Å |
| Second dielectric layer | $Si_3N_4$ | 500 Å |
| Reflective layer | Al | 700 Å |
| Covering layer | UV resin | 10 μm |

Example 12

The same lubricating composition as used in Example 1 was coated on the covering layer of the magneto-optical disk obtained above.

Example 13

A lubricating composition comprising 50 parts by weight of dimethylsilicone oil (average molecular weight: about 38,000), 10 parts by weight of the fatty acid-modified silicone (i) and 10 parts by weight of the fatty acid-modified silicone (ii), respectively used in Example 1, and 25,000 parts by weight of hexane was prepared, and coated in the same manner as in Example 1 on the covering layer of the magneto-optical disk prepared above.

Comparative Example 1

A lubricating composition comprising 70 parts by weight of dimethylsilicone oil (average molecular weight: 38,000) and 25,000 parts by weight of hexane was prepared, and coated in the same manner as in Example 1 on the covering layer of the magneto-optical disk prepared above.

Comparative Example 2

A lubricating composition comprising 70 parts by weight of fatty acid-modified silicone (i) and 25,000 parts by weight of hexane was prepared, and coated in the same manner as in Example 1 on the covering layer of the magneto-optical disk prepared above.

Comparative Example 3

A lubricating composition comprising 70 parts by weight of butyl oleate and 25,000 parts by weight of hexane, and coated in the same manner as in Example 1 on the covering layer of the magneto-optical disk prepared above.

Comparative Example 4

A lubricating composition comprising 50 parts by weight of dimethylsilicone oil (average molecular weight: 38,000), 20 parts by weight of butyl oleate and 25,000 parts by weight of hexane was prepared, and coated in the same manner as in Example 1 on the covering layer of the magneto-optical disk prepared above.

Comparative Example 5

A lubricating composition comprising 50 parts by weight of fatty acid-modified silicone (i), 20 parts by weight of butyl oleate and 25,000 parts by weight of hexane was prepared, and coated in the same manner as in Example 1 on the covering layer of the magneto-optical disk prepared above.

By using a friction tester provided with a plastic-made slider having a radius of curvature of 5 mm, the slider was contacted with the magneto-optical disk thus obtained at a position of a radius of 25 mm, a load of 3 g was applied to the slider, then the magneto-optical disk was rotated at 500 rpm, and the friction coefficient and the degree of scarring of the covering layer were examined.

TABLE 3

|  | Friction coefficient | Scar of covering layer |
|---|---|---|
| Example 12 | 0.18 | ⊚ |
| Example 13 | 0.23 | ⊚ |
| Comp. Example 1 | 0.55 | Δ |
| Comp. Example 2 | 0.45 | x |
| Comp. Example 3 | 0.50 | Δ |
| Comp. Example 4 | 0.70 | x |
| Comp. Example 5 | 0.82 | x |

In the Table, the friction coefficient was evaluated by determining it after 20,000 passes. The degree of scarring of the covering layer surface was evaluated in the following manner to obtain as objective evaluation as possible. The sliding marks after 20,000 passes were photographed by using a photomicrographic apparatus (mfd. by Olympus Optical Co. Ltd.) at 50 magnifications, and the photograph was visually observed by 100 observers. The results were then averaged to calculate a synthetic evaluation result. When 90 or more observers judged that utterly no sliding scar was present the result was expressed as ⊚, when 60 or more observers judged that utterly no sliding scar was present the result was expressed as o, when 60 or more observers judged that sliding scars were present at one or more parts of the periphery the result was expressed as Δ, and when 60 or more observers judged that sliding scars were present all around the periphery the result was expressed as x.

As is apparent from the Table, the magneto-optical disks obtained in the Examples have a low friction coefficient and show a low degree of scarring of the covering layer. This reveals that the magneto-optical recording medium obtained according to the present invention shows a markedly improved durability when a magnetic head is made to slide along the medium.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lubricating composition which comprises (a) a silicone oil, (b) a fatty acid-modified silicone and (c) a fatty acid ester wherein weight ratio of component (a) to component (b) satisfies the relationship $0.1 \leq a/(a+b) \leq 0.98$, weight ratio of component (b) to (c) satisfies $0.5 \leq b/(b+c) \leq 0.99$, and weight ratio of (c) to (a) satisfies $0.001 \leq c/(c+a) \leq 0.1$.

2. A lubricating composition according to claim 1, wherein a ratio of the number average molecular weight of component (a), Ma, to that of component (b), Mb, is in the range specified by $1 \leq Ma/Mb \leq 100$.

3. A lubricating composition according to claim 1, wherein a ratio of the number average molecular weight of component (b), Mb, to that of component (c), Mc, is in the range specified by $2 \leq Mb/Mc \leq 50$.

4. A lubricating composition according to claim 1, wherein a ratio of the number average molecular weight of component (c), Mc, to that of component (a), Ma, is in the range specified by $0.0022 \leq Mc/Ma \leq 0.2$.

5. The lubricating composition according to claim 1, wherein said fatty acid-modified silicone (b) is represented by the formula

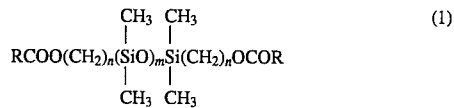

wherein R is a linear or branched aliphatic hydrocarbon group which may contain one or more double bonds, m is an integer specified by $5 \leq m \leq 500$, and n is an integer of 1 or more.

6. A recording medium for recording signals by making sliding contact with a magnetic head, which medium comprises a disk-shaped transparent substrate having a magnetic recording layer thereon, a covering layer containing a synthetic resin formed on said recording layer, and a lubricating composition comprising (a) a silicone oil, (b) a fatty acid-modified silicone and (c) a fatty acid ester wherein weight ratio of component (a) to compartment (b) satisfies the relationship $0.1 \leq a/(a+b) \leq 0.98$, weight ratio of component (b) to (c) satisfies $0.5 \leq b/(b+c) \leq 0.99$, and weight ratio of (c) to (a) satisfies $0.001 \leq c/(c+a) \leq 0.1$ provided on the surface of said covering layer.

7. A recording medium according to claim 6, wherein a ratio of the number average molecular weight of component (a), Ma, to that of component (b), Mb, is in the range specified by $1 \leq Ma/Mb \leq 100$.

8. A recording medium according to claim 6, wherein a ratio of the number average molecular weight of component (b), Mb, o that of component (c), Mc, is in the range specified by $2 \leq Mb/Mc \leq 50$.

9. A recording medium according to claim 6, wherein a ratio of the number average molecular weight of component (c), Mc, to that of component (a), Ma, is in the range specified by $0.0022 \leq Mc/Ma \leq 0.2$.

10. A recording medium according to claim 6, said fatty acid-modified silicone (b) is represented by the formula

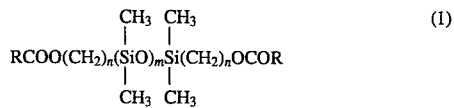

wherein R is a linear or branched aliphatic hydrocarbon group which may contain one or more double bonds, m is an integer specified by $5 \leq m \leq 500$, and n is an integer of 1 or more.

* * * * *